United States Patent
Cariello

(10) Patent No.: US 11,663,123 B2
(45) Date of Patent: May 30, 2023

(54) PAGE VALIDITY TABLE COLORS FOR GARBAGE COLLECTION

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 9 days.

(21) Appl. No.: 17/241,856

(22) Filed: Apr. 27, 2021

(65) Prior Publication Data
US 2022/0342812 A1    Oct. 27, 2022

(51) Int. Cl.
*G06F 12/02*    (2006.01)
*G06F 12/0882*  (2016.01)
*G06F 12/0891*  (2016.01)

(52) U.S. Cl.
CPC ...... *G06F 12/0253* (2013.01); *G06F 12/0246* (2013.01); *G06F 12/0882* (2013.01); *G06F 12/0891* (2013.01)

(58) Field of Classification Search
None
See application file for complete search history.

(56) References Cited

U.S. PATENT DOCUMENTS

| | | | |
|---|---|---|---|
| 10,642,505 B1* | 5/2020 | Kuzmin | G06F 3/0679 |
| 11,249,652 B1* | 2/2022 | Kuzmin | G06F 3/0649 |
| 2015/0178190 A1* | 6/2015 | Fisher | G06F 3/0665 |
| | | | 711/103 |
| 2016/0357480 A1* | 12/2016 | Choi | G06F 3/061 |
| 2018/0307598 A1* | 10/2018 | Fischer | G06F 3/0643 |
| 2020/0073798 A1* | 3/2020 | Cho | G06F 12/0238 |
| 2021/0200454 A1* | 7/2021 | Kim | G06F 3/0631 |
| 2021/0397550 A1* | 12/2021 | Byun | G06F 3/0659 |

* cited by examiner

*Primary Examiner* — Kevin Verbrugge
(74) *Attorney, Agent, or Firm* — Holland & Hart LLP

(57) ABSTRACT

Methods, systems, and devices for page validity table colors for garbage collection are described. The memory system may obtain validity information and information associated with a characteristic for each page of a block of data and based on initiating a reorganization procedure on the block of data of the memory system. The memory system may move, for the reorganization procedure, a first set of pages of the block of data associated with a first value of the characteristic to a first portion of the memory system according to the validity information for the first set of pages. The memory system may move, for the reorganization procedure, a second set of pages of the block of data associated with a second value of the characteristic to a second portion of the memory system according to the validity information for the second set of pages.

22 Claims, 7 Drawing Sheets

PAGE VALIDITY TABLE COLORS FOR GARBAGE COLLECTION

FIELD OF TECHNOLOGY

The following relates generally to one or more systems for memory and more specifically to page validity table colors for garbage collection.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not and (NAND) memory devices, and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
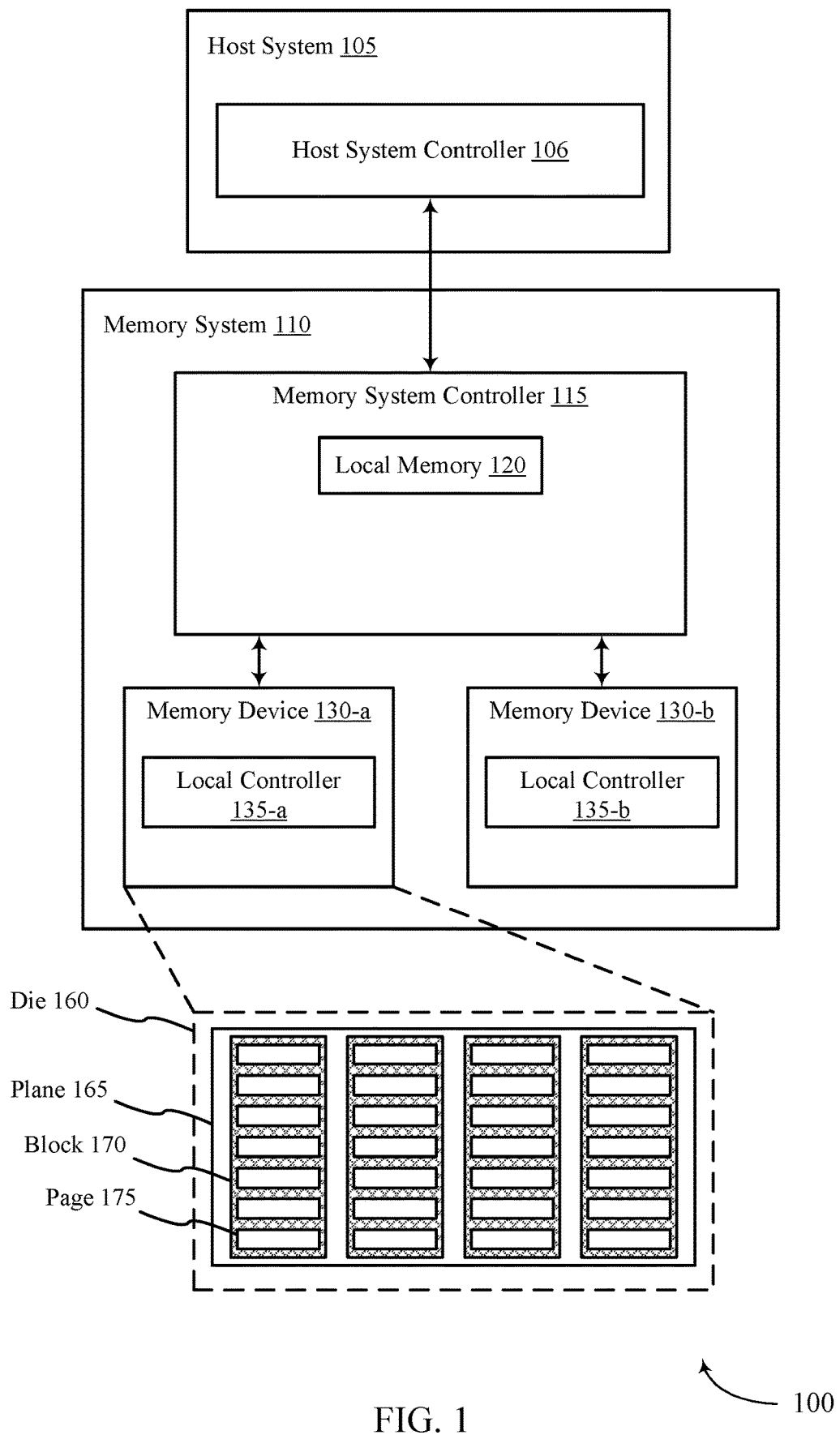
FIG. 1 illustrates an example of a system that supports page validity table colors for garbage collection in accordance with examples as disclosed herein.

In some garbage collection procedures, a block may include pages of valid data and invalid data (e.g., old data that was previously written but is no longer associated with a valid logical address, such as a logical address referenced by a host system in a logical-to-physical (L2P) mapping table). In some cases, a page validity table (PVT) may be used to track the mapping status (e.g., valid or invalid data) for pages within physical memory blocks. Each time a page that was written to a physical block is overwritten (e.g., written to a new location) or unmapped, the PVT may be updated to reflect that the page is invalid. In some cases, the PVT may be stored in a location that is outside the physical memory blocks storing the pages of data because the PVT is frequently updated. The PVT may be used in a garbage collection procedure, which may free up blocks by moving valid data to new blocks. For example, the valid data may be written (e.g., re-written) to the memory system (e.g., to a different physical block of the memory system). However, the PVT may not include information to enable the memory system to separate out different types of data (e.g., hot/cold data, data associated with different streams or applications, etc.) during the garbage collection procedure, and thus after the garbage collection procedure is performed, some blocks may quickly become fragmented as data that is hot may be overwritten (e.g., and thus written to a different physical location) while cold data remains in the block.

Such techniques (e.g., performing the garbage collection procedure without separating the data) may result in increased write amplification and lower endurance, in terms of TBW (Total Bytes Written) by the host system. Moreover, the memory system may experience a performance loss (e.g., due to additional garbage collection procedures or increasing quantities of write operations), which may increase the latency for other operations related to the host system. The overall performance of the memory system may decrease, which may result in a host system experiencing impaired read, write, and erase speeds. Techniques for increasing efficiency of garbage collection and page management may be desired.

Aspects of the present disclosure address the above and other deficiencies by utilizing PVT colors for the garbage collection procedure. For example, the memory system may store additional information (e.g., PVT "color" information) in addition to the PVT. The "color" information may indicate whether data is hot or cold, or associated with different streams or applications. In some cases, the "color" information may be maintained within the same block as the data because the "color" information may be static with respect to valid data. To use the "color" information in the garbage collection procedure, the memory system may use a logic operation (e.g., AND) between a bitmap representing a first "color" (e.g., hot data, associated with a first stream, etc.) and the PVT, to move the valid data associated with the first "color" to a first location. The memory system may then use a logic operation (e.g., AND) between a bitmap representing a second "color" (e.g., cold data, data associated with a second stream, etc.) and the PVT, to move the valid data associated with the second "color" to a second location. By separating the data based on the "color" information and the PVT, the overall performance of the memory system may increase. For example, separating data for garbage collection may improve the overall efficiency of the memory system, which may result in the memory system experiencing improved read, write, and erase speeds, reduced power consumption, improved processing times, reduced wear on memory cells, and the like.

Figure 2:
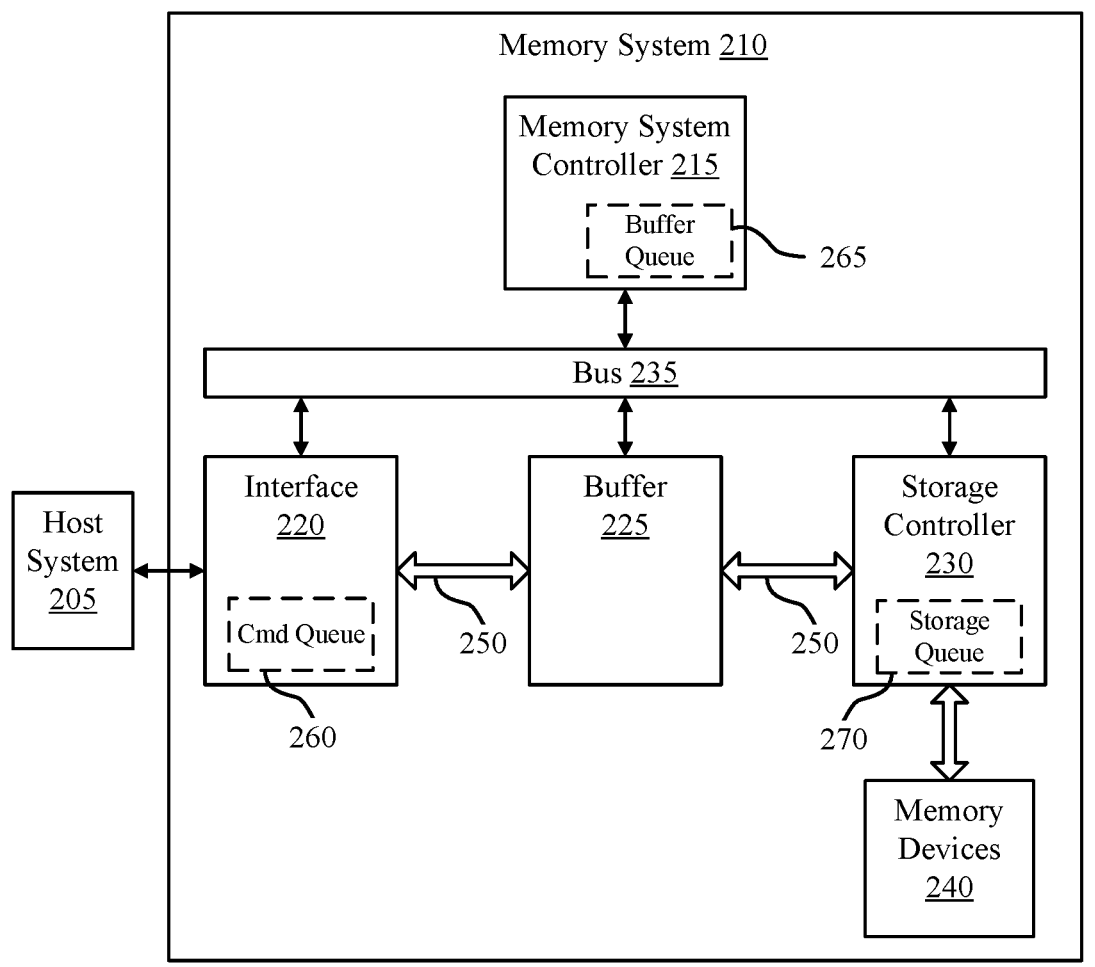
FIG. 2 illustrates an example of a system that supports page validity table colors for garbage collection in accordance with examples as disclosed herein.

Features of the disclosure are initially described in the context of systems with reference to FIGS. 1 through 2. Features of the disclosure are described in the context of block diagrams and flow diagrams with reference to FIGS. 3-4. These and other features of the disclosure are further illustrated by and described in the context of an apparatus diagram and flowchart that relate to page validity table colors for garbage collection with reference to FIGS. 5-6.

FIG. 1 illustrates an example of a system 100 that supports page validity table colors for garbage collection in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support page validity table colors for garbage collection. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the memory system 110 may initiate a reorganization procedure. The reorganization procedure may be an example of a garbage collection procedure. The memory system 110 may obtain validity information for each page of the block of data in response to initiating a reorganization procedure on a block of data of the memory system 110. In some cases, the validity information may be obtained from a PVT. The memory system 110 may obtain information associated with a characteristic for each page of the block of data in response to initiating the reorganization procedure. For example, the information associated with the characteristic may be an example of the "color" information.

The memory system 110 may move, for the reorganization procedure, a first set of pages of the block of data associated with a first value of the characteristic to a first portion of the memory system 110 according to the validity information for the first set of pages. The memory system 110 may move, for the reorganization procedure, a second set of pages of the block of data associated with a second value of the characteristic to a second portion of the memory system 110 according to the validity information for the second set of pages. The second portion of the memory system 110 may be a different block or a different type of memory (e.g., TLC or QLC) for a SLC memory.

FIG. 2 illustrates an example of a system 200 that supports page validity table colors for garbage collection in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

The memory system 210 may initiate a garbage collection procedure (e.g., reorganization procedure), load the PVT for the source block of the memory system 210, and load a color bitmap for the source block of the memory system 210. The memory system 210 may then process one color (e.g., characteristic) at a time according to the PVT. The PVT may be an example of a bitmap that tracks the mapping status of a physical block. In some examples, the PVT may be updated every time an LBA is overwritten or unmapped. The PVT may be used to speed up the garbage collection procedure.

For example, the memory system 210 may use a logic operation (e.g., AND) between the color bitmap representing a first color (e.g., hot data, associated with a first stream, etc.) and the PVT, to move the valid data associated with the first "color" to a first location (e.g., destination block). The memory system may then use a logic operation (e.g., AND) between the color bitmap representing a second color (e.g., cold data, data associated with a second stream, etc.) and the PVT, to move the valid data associated with the second "color" to a second location (e.g., a different destination block).

In other systems, due to hardware limitations (e.g., SRAM for the write buffers, overprovisioning for the open blocks, or write bandwidth limitations), the memory system 210 may be unable to efficiently and effectively ensure a proper separation of data on direct writes, which may result in mixing data of different characteristics within a single virtual block of the memory system 210. To enable an efficient and effective data separation during the garbage collection procedure, the memory system may save the data attribute information (e.g., color) in a dedicated structure of the memory system 210. In such cases, the memory system 210 may identify and separate hot data from cold data and/or store physically continuous data that may be logically related (e.g., data belonging to the same stream or application), thereby improving the operations of the memory system 210. Although described in the context of NAND (e.g., flash) memory, emerging memory may be used in place of NAND memory, in some cases.

Figure 3A:
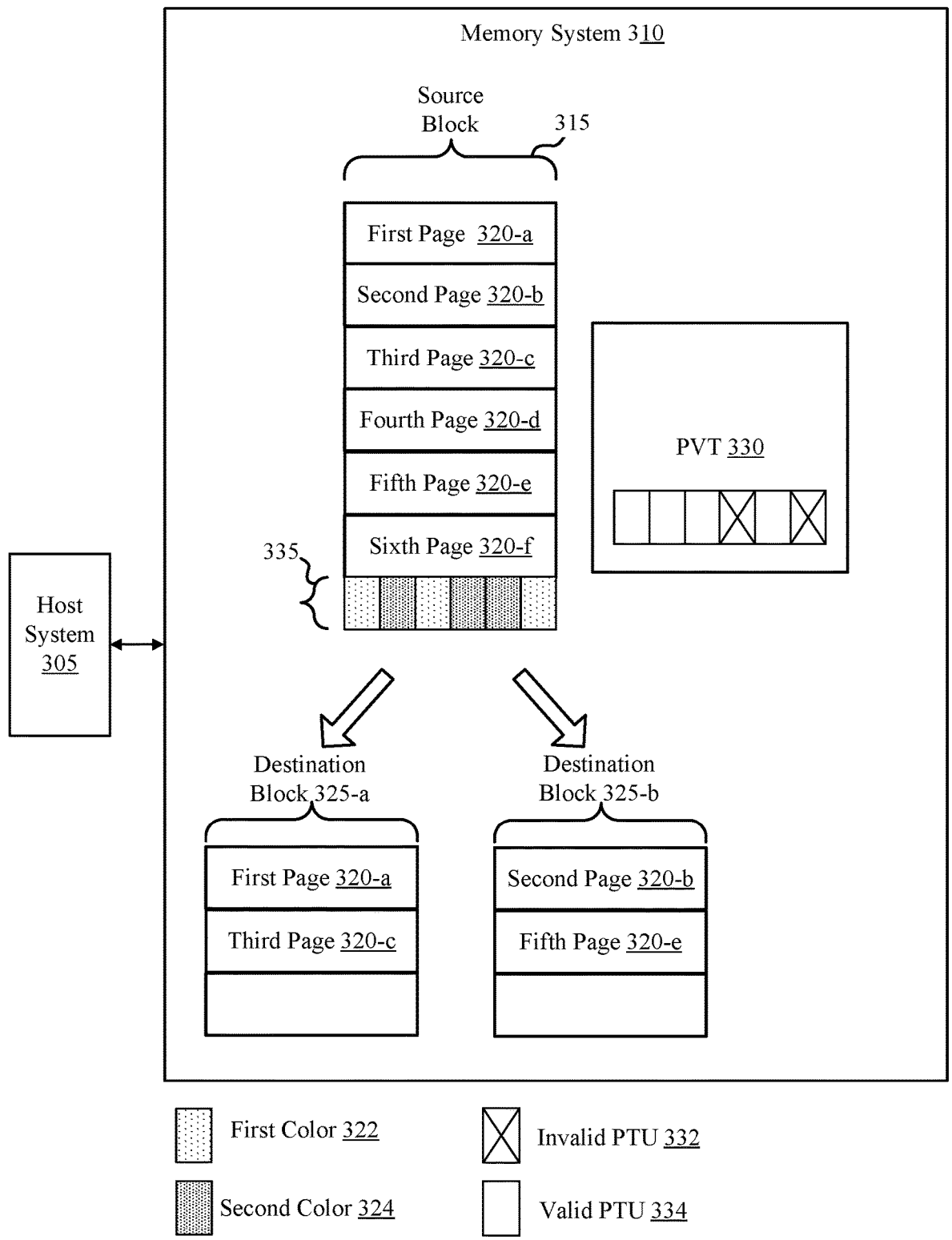
FIG. 3A illustrates an example of a block diagram that supports page validity table colors for garbage collection in accordance with examples as disclosed herein.

FIG. 3A illustrates an example of a block diagram 300-a that supports page validity table colors for garbage collection in accordance with examples as disclosed herein. The block diagram 300-a may include a host system 305 and a memory system 310, which may be examples of the host system and the memory system, respectively, as described in reference to FIGS. 1 and 2. The memory system 310 may include a source block 315, destination blocks 325, and a PVT 330. The source block 315 and destination blocks 325 may include pages 320, and the source block may include a color bitmap 335 that may include a first color 322 and a second color 324.

In some cases, the memory system 310 may identify whether the data is a first type of data (e.g., hot data) or a second type of data (e.g., cold data) according to a color bitmap 335 and a PVT 330. For example, hot data may be data that has a higher tendency for being overwritten, while cold data may have a lower tendency to be overwritten. In such cases, the memory system 310 may directly write the first type of data to a first location (e.g., destination block 325-a) and write the second type of data to a second location (e.g., destination block 325-b) such that the memory system 310 may separate the data during the garbage collection procedure. The memory system 310 may use the color bitmap 335 and PVT 330 to efficiently and effectively separate the different types of data during the garbage collection procedure by moving the first type of data to one location and the second type of data to a different location.

For example, the memory system 310 may receive, from a host system 305, a plurality of commands to perform write operations. The plurality of commands may each include a stream identifier (e.g., stream identification (ID)) for pages 320 of data associated with the plurality of commands. For example, the memory system 310 may receive the stream identifier included within the write operation. The stream identifier may indicate whether the data included in the pages 320 is the first type of data or a second type of data. In some cases, the write command may include different stream identifier for one or more data streams associated with the write operation. In some cases, the stream identifier may be for an LBA, a physical block address, or data unit associated with each of the plurality of commands, which may be a different size than the pages 320.

The memory system 310 may store the stream identifiers within the block of data (e.g., source block 315). The memory system 310 may determine the characteristic for each page 320 of the source block 315 based on the stream identifiers. For example, the characteristic may include a type of data (e.g., first type or second type), a type of application associated with the data, a stream identifier, or a combination thereof. The memory system 310 may determine a color associated with each page 320 based on the stream identifier. The color may indicate the type of data, the stream identifier, an application type, or a combination thereof. For example, a first color 322 may be associated with the first type of data and a second color 324 may be associated with the second type of data. In some cases, the memory system 310 may determine a color associated with each LBA, physical block address, or data unit based on the stream identifier.

In some examples, the memory system 310 may receive the command and store a color bitmap 335 (e.g., including color information) within the source block 315. For example, the memory system 310 may store the color bitmap 335 at the end of the source block 315 after the source block 315 is written. The color bitmap 335 may include information that is static (e.g., unchanged). In some cases, the information included in the color bitmap 335 may be identified and stored while a write operation occurs. In some examples, the information associated with the characteristic includes the color bitmap 335 having each bit representing the characteristic for one page 320 of the block of data. In some examples, the information in the color bitmap 335 associated with the characteristic may include one entry (e.g., one bit or multiple bits) for each of multiple portions of each page 320 of the block of data. For example, each page 320 may include multiple portions, and the color bitmap may include one or more bits to indicate the color for each portion of each page 320. In such cases, the memory system may read the page 320 and information associated with the characteristic to identify the color for a single unit (e.g., data unit, physical address, logical block address).

The memory system 310 may identify the source block 315 for the garbage collection procedure. The source block 315 may include the plurality of pages 320 where the pages 320 may be identified as associated with a first color 322 or a second color 324. The color bitmap 335 may include an indication of the first color 322 and the second color 324. For example, the color bitmap 335 may indicate that the first page 320-a may include the first type of data (e.g., associated with the first color 322) and that the second page 320-*b* may include the second type of data (e.g., associated with the second color 324).

The memory system 310 may reference the PVT 330 and identify whether the pages 320 include valid data or invalid data. The PVT 330 may include page table units (PTUs) which may indicate whether the data is valid or invalid. For example, the memory system 310 may obtain validity information from the PVT 330 and determine that the first page 320-*a* may include valid data based on the PVT 330 including a valid PTU 334. The memory system 310 may determine that the fourth page 320-*d* may include invalid data based on the PVT 330 including an invalid PTU 332.

The PVT 330 may be an example of a bitmap of the physical blocks of the source block 315. Each bit (e.g., PTU) may represent whether the physical location includes valid data or invalid data. By the memory system 310 obtaining validity information from the PVT 330, the memory system 310 may operate at improved speeds and efficiency by bypassing a look-up procedure in the L2P table. The PVT 330 may indicate which pages 320 may be moved (e.g., written) to a new block (e.g., destination block 325). For example, the memory system 310 move valid data to a new block while maintaining invalid data in the source block 315 to be erased later. The PVT 330 may be updated during the garbage collection procedure to indicate whether the pages 320 include valid or invalid data. For example, the PVT 330 may be updated while the color bitmap 335 may be static (e.g., unchanged).

Prior to garbage collection, the PVT 330 may indicate that the block of data contains an amount of invalid data that exceeds a threshold amount. Conversely, the PVT 330 may indicate that the block of data contains no invalid data (e.g., contains valid data). The memory system 310 may determine that an amount of valid data of a block of data falls below a threshold (e.g., contains invalid data). In such cases, the memory system 310 may perform garbage collection. After garbage collection, the invalid data indicated in the PVT 330 may indicate that an entirety of the block of data contains invalid data. The memory system 310 may erase the block of data after verifying that all read operations of the garbage collection procedure for the block of data are complete.

In some cases, the memory system 310 may receive information encoded by the color bitmap 335 and the PVT 330 to separate the data included the source block 315 based on the validity information and characteristic (e.g., color). For example, the memory system 310 may separate a color indication from the PVT 330 and store the color indication with the data in a portion of the source block 315. For example, the color indication may be saved in the color bitmap 335 at the end of the source block 315. During the garbage collection procedure, the speed of the operation may increase because the memory system 310 may access the color bitmap 335 from the source block 315 to identify the logical addresses of the blocks of data. The PVT 330 may be stored externally from the source block 315 but within the memory system 310. For example, the PVT 330 may be stored in dedicated regions of the memory system 310, or in separate blocks of the memory system 310 than the source block 315 and the destination blocks 325.

The memory system 310 may separate strands of data (e.g., including stream identifiers) based on whether the data is a first color 322 (e.g., the first type of data) or the second color 324 (e.g., the second type of data). In such cases, the memory system 310 may move data of different colors to different memory locations (e.g., different destination blocks 325, different types of cells including SLC, TLC, QLC, etc.). For example, hot data may be moved to SLC cells while cold data may be moved to TLC or QLC cells.

The memory system 310 may recopy (e.g., transfer) the data associated with the first color 322 (e.g., hot data) to destination block 325-*a*. In some case, the memory system 310 may check other source blocks 315 for the identified first color 322. For example, the memory system 310 may identify that the first page 320-*a* and the third page 320-*c* each include valid data based on the PVT 330 and a first color 322 indicated by the color bitmap 335. In such cases, the memory system 310 may move (e.g., copy and invalidate) the data (e.g., in a sequential order) such that the first page 320-*a* and the third page 320-*c* may be moved from the source block 315 and to the destination block 325-*a*. The memory system 310 may refrain from moving the sixth page 320-*f* from the source block 315 to the destination block 325-*a* based on the PVT 330 indicating the sixth page 320-*f* includes invalid data even though the color bitmap 335 indicates that the sixth page 320-*f* is the first color 322.

In some cases, the memory system 310 may identify that a logical block address, a physical block address, or a data unit may each include valid data based on the PVT 330 and a first color 322 indicated by the color bitmap 335. In such cases, the memory system 310 may move (e.g., copy and invalidate) the data (e.g., in a sequential order) associated with the logical block address, the physical block address, or the data unit to a different location.

The memory system 310 may move (e.g., copy and invalidate) the data associated with the second color 324 (e.g., cold data) to destination block 325-*b* after transferring the data associated with the first color 322. In some case, the memory system 310 may check other source blocks 315 for the identified second color 324. For example, the memory system 310 may identify that the second page 320-*b* and the fifth page 320-*e* each include valid data based on the PVT 330 and the second color 324 indicated by the color bitmap 335. In such cases, the memory system 310 may move the data (e.g., in a sequential order) such that the second page 320-*b* and the fifth page 320-*e* may be moved from the source block 315 and to the destination block 325-*b*. The memory system 310 may refrain from moving the fourth page 320-*d* from the source block 315 to the destination block 325-*b* based on the PVT 330 indicating the fourth page 320-*d* includes invalid data even though the color bitmap 335 indicates that the fourth page 320-*d* is the second color 324.

In some cases, the memory system 310 may identify that a logical block address, a physical block address, or a data unit may each include valid data based on the PVT 330 and a second color 324 indicated by the color bitmap 335. In such cases, the memory system 310 may move (e.g., copy and invalidate) the data (e.g., in a sequential order) associated with the logical block address, the physical block address, or the data unit to a different location than the data associated with the first color 322. For example, the PVT 330 may indicate that a page is valid, and the color bitmap 335 may indicate that a first portion of the page is associated with the first color 322 and a second portion of the page is associated with the second color 324 and the memory system 310 may move the first portion to a first location (e.g., first destination block) and the second portion to a second location (e.g., second destination block). The memory system 310 may update the L2P table accordingly.

In such cases, the memory system 310 may perform the garbage collection procedure on one color at a time (e.g., process each color independently of the other color). The memory system 310 may perform a first part of the garbage collection on the first color 322 (e.g., hot data) prior to performing a second part of the garbage collection procedure on the second color 324 (e.g., cold data).

The memory system 310 may read valid data and write to new blocks (e.g., destination block 325-a or 325-b). In such cases, the destination blocks 325 may include valid data, thereby ensuring that the destination blocks 325 include valid data that may be involved in the garbage collection procedure. The source block 315 may include invalid data which may be overwritten by incoming host data (e.g., after moving all valid data and erasing the block). For example, data may be invalidated by incoming write operations from the host system 305 to a previously written logical address rather than becoming invalid due to a garbage collection procedure. The invalid data may not be included in destination blocks 325, thereby freeing up additional memory resources.

In conventional garbage collection procedures, the memory system 310 may determine which blocks of data may be selected for the garbage collection procedure and select the source block 315 for the garbage collection procedure based determining that the blocks of data include a lower amount of valid data. In such cases, the memory system 310 may transfer the valid data from the source block 315 to a destination block 325 without separating the data (e.g., separation of hot and cold data), thereby increasing the amount of management operations and decreasing the overall performance of the memory system 310.

In other systems, during a garbage collection procedure, the memory system 310 may identify whether the page 320 includes a first type of data (e.g., hot data) and move the first type of data to a different type of memory (e.g., SLC). The first type of data may be overwritten at an increased rate as compared to overwriting data of a second type (e.g., cold data). In such cases, the memory system 310 may move the first type of data to the different type of memory and initiate a second garbage collection procedure. In some examples, the write amplification factor may be affected such that the operations of the memory system 310 may decrease, thereby increasing latency of other memory system operations and degrading the overall memory system 310.

By implementing a smart garbage collection procedure, the PVT 330 and color bitmap 335 may be combined and used during the garbage collection procedure to separate the data based on a color (e.g., type of data) and validity information. If the memory system 310 separates the data according to the PVT 330 and color bitmap 335 during the garbage collection procedure, the memory system 310 may store the valid, hot data in a separate destination block 325 from the valid, cold data and avoid mixing the valid cold data with other data that is more frequently updated, thereby increasing the efficiency of future garbage collection procedures (e.g., performing garbage collection on fewer overall pages). Sorting data into different blocks based on the PVT 330 and the color bitmap 335 may result in less data being part of future garbage collection procedures.

Figure 3B:
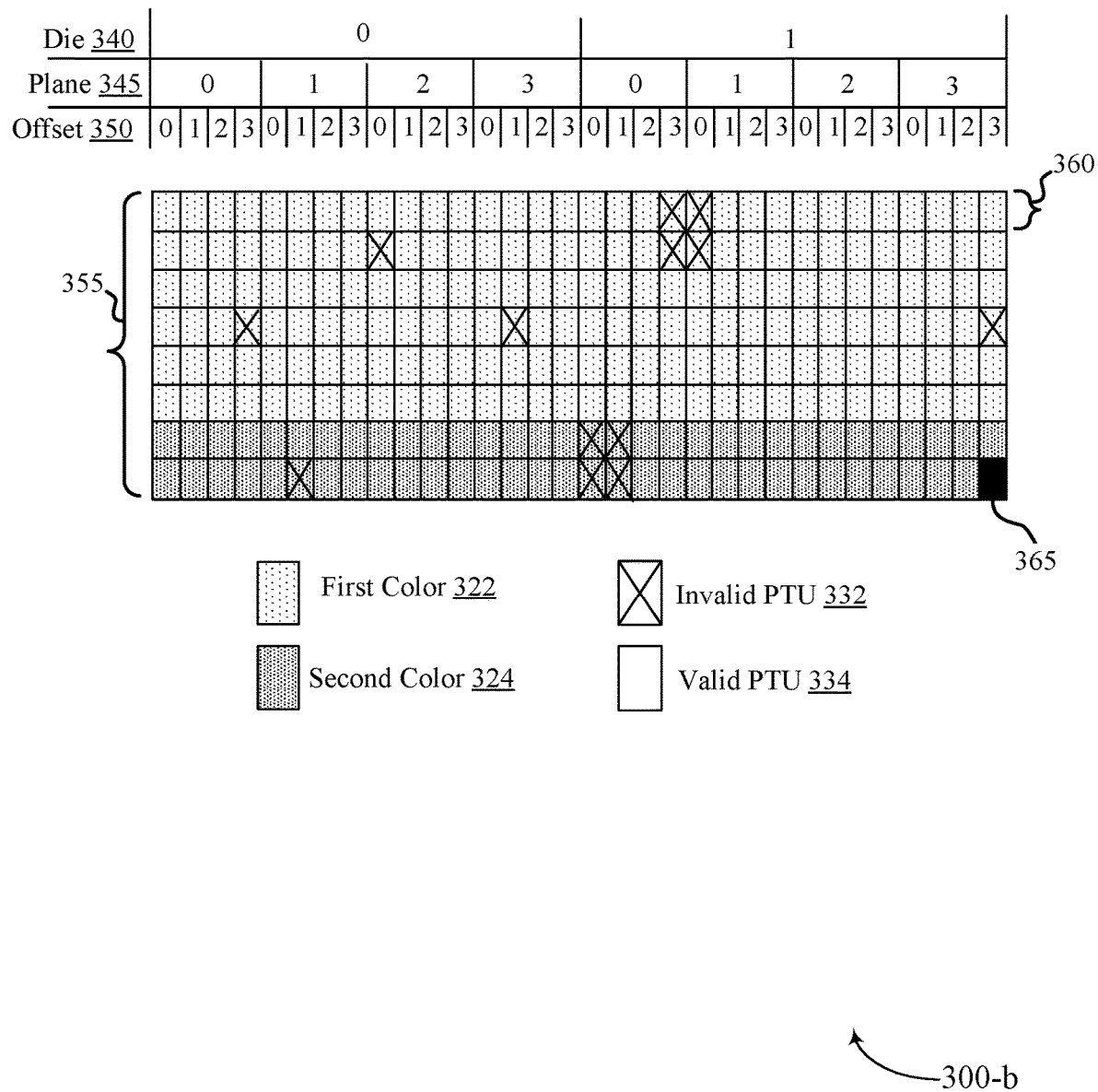
FIG. 3B illustrates an example of a virtual block that supports page validity table colors for garbage collection in accordance with examples as disclosed herein.

FIG. 3B illustrates an example of a virtual block 300-b that supports page validity table colors for garbage collection in accordance with examples as disclosed herein. The virtual block 300-b may include physical blocks 360. The virtual block 300-b may indicate a color and whether the data is valid data or invalid data (e.g., stored in a PVT outside the virtual block 300-b) for a corresponding die 340, plane 345, and page 355. The virtual block 300-b may also include the bitmap 365.

The virtual block 300-b may be across multiple dies 340 and multiple planes 345. For example, the virtual block 300-b may include a first die 340 and a second die 340. The virtual block 300-b may include four planes 345 for each die 340. The virtual block 300-b may also include an offset 350 which may include four offsets 350 for each plane 345. In such cases, the memory system may perform a write operation to the same address on a die 340 to multiple planes 345 at a time.

In some cases, an additional bit may be stored in addition to the PVT and the information on validity for virtual block 300-b may be transformed from a "black and white" picture to a "colored" bit map. In such cases, the virtual block 300-b may include a valid PTU 334 or an invalid PTU 332 as well as an associated color of each physical block 360 to optimize the garbage collection procedure. In some examples, the first color 322 may indicate hot data and the second color 324 may indicate cold data. In some cases, the virtual block 300-b may include more than two colors (e.g., include a third color, a fourth color, etc.). The virtual block 300-b may be used to move the cold data (e.g., second color 324) to a different type of memory (e.g., TLC or QLC). The PVT for virtual block 300-b may indicate whether the PTU includes valid data or invalid data.

The memory system may include information encoded by a PVT color that is intrinsically static (e.g., identified in response to receiving data from the host system and not updated after) such that the memory system may separate the color from the PVT and save the color along with data in the same virtual block 300-b (e.g., the end of the virtual block 300-b). For example, the color may be stored in the bitmap 365. In such cases, the PVT color for the garbage collection procedure may be scalable to different and dynamic quantity of colors.

In some cases, a bitmap 365 may be obtained for each group (e.g., type or stream identifier). The stream identifier may identify one or more different data streams which may be associated with (e.g., use or relate to operational aspects for) different performance constraints to increase the user experience. The memory system may determine an application identification (ID) that may indicate a type of data of the write operation, a type of application associated with the write application (e.g., picture, movie, video, etc.), or both in response to determining the stream identifier. In some cases, the memory system may include or obtain a quantity of different color bitmaps for different groups. For example, if the host system uses more than two groups, the memory system may store each group in a different bitmap or each group may be combined in a same bitmap (e.g., each location corresponding to one page may include more than one bit).

The memory system may generate a bitmap 365 from the color information (e.g., the first bitmap can be the same as stored while the second bitmap is inverse) and logic operations (e.g., AND) that may be used to determine the valid pages for a given color. For example, the memory system may determine a type of data associated with each page of the block of data in direct response to obtaining the information associated with the characteristic. In such cases, the characteristic includes the type of data. For example, the memory system may determine whether the data is the first type of data (e.g., hot data) or the second type of data (e.g. cold data). The memory system may load the bitmap 365 from the end of the virtual block 300-b (e.g., included in a last physical block 360 of the virtual block 300-b).

Figure 4:
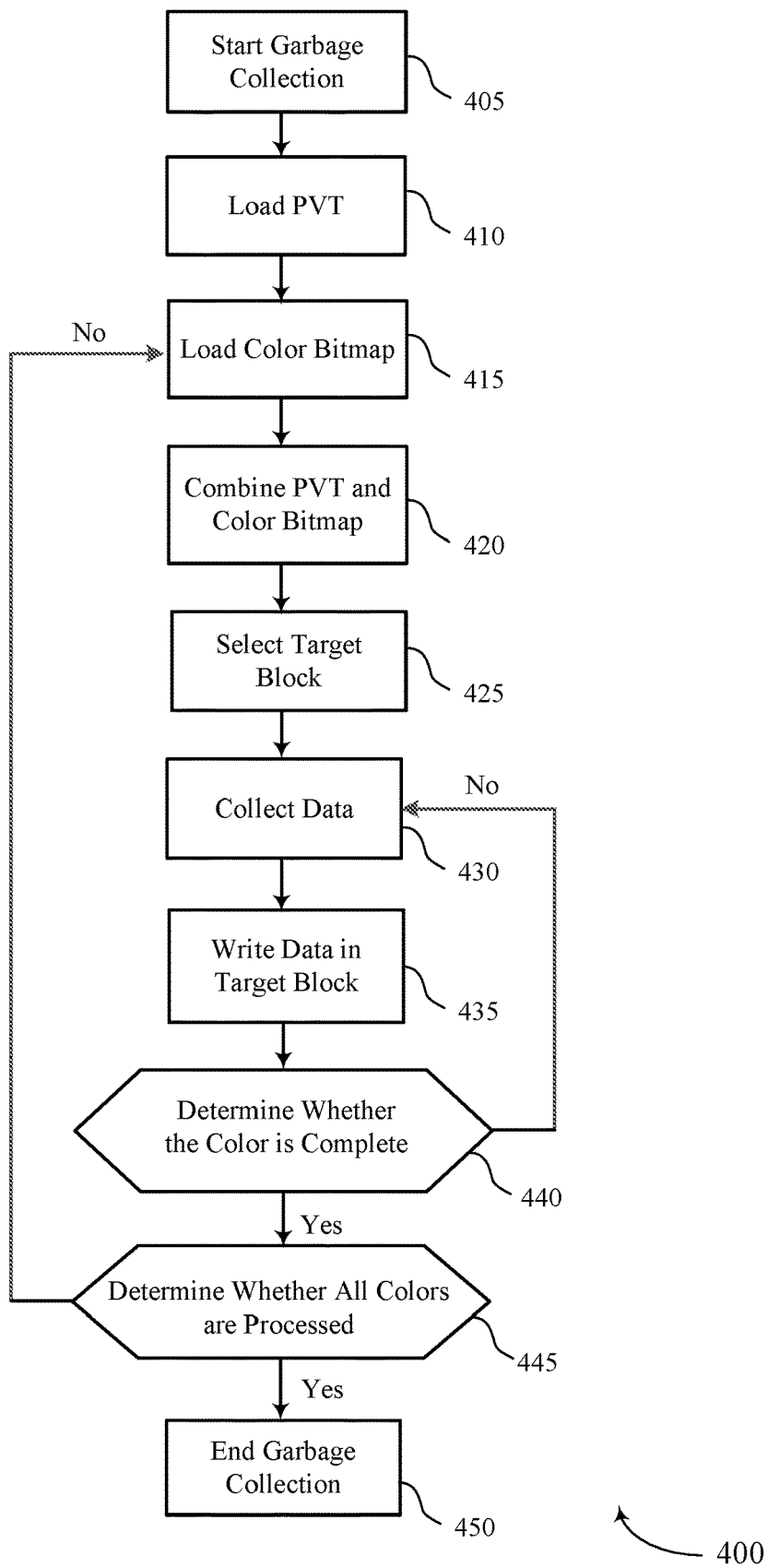
FIG. 4 illustrates an example of a flow diagram that supports page validity table colors for garbage collection in accordance with examples as disclosed herein.

FIG. 4 illustrates an example of a flow diagram 400 that supports page validity table colors for garbage collection in accordance with examples as disclosed herein. The operations of flow diagram 400 may be implemented by any device or its components as described herein. For example, the operations of flow diagram 400 may be performed by a memory system as described with reference to FIG. 1. Alternative examples of the following may be implemented, where some steps are performed in a different order or not at all. Some steps may additionally include additional features not mentioned below. The flow diagram 400 illustrates techniques where a memory system may use a PVT and color bitmap to perform the garbage collection procedure.

Aspects of the flow diagram 400 may be implemented by a controller, among other components. Additionally or alternatively, aspects of the flow diagram 400 may be implemented as instructions stored in a controller (e.g., controller coupled with the memory system). For example, the instructions, when executed by a controller (e.g., the memory system controller 115), may cause the controller to perform the operations of the flow diagram 400.

At 405, the garbage collection procedure may be started. For example, the memory system may initiate the garbage collection procedure (e.g., a reorganization procedure) on a block of data of the memory system. The memory system may initiate the garbage collection procedure during an idle period. In such cases, the memory system may initiate the garbage collection procedure regardless of receiving a command to perform the garbage collection procedure.

At 410, the PVT may be loaded. For example, the memory system may load the PVT for the source block from a location outside of the block. In such cases, the memory system may obtain the PVT from a portion of the memory system outside of the block of data. In some examples, the memory system may obtain validity information for each page of the block of data in direct response to initiating the garbage collection procedure and loading the PVT table.

At 415, the color bitmap may be loaded. For example, the memory system may load the color bitmap from one or more memory cells of the memory system (e.g., within the block of data). In such cases, the memory system may obtain the information associated with the characteristic (e.g., color associated with the color bitmap) from one or more memory cells associated with the block of data. The memory system may obtain information associated with a characteristic for each page of the block of data based on initiating the garbage collection procedure. The characteristic may be received with data transmitted from the host system. That characteristic may indicate a type of data (e.g., hot or cold data), a stream, an application, or a combination thereof. In some cases, the characteristic may be determined from the information associated with the stream (e.g., stream ID).

At 420, the PVT and color bitmap may be combined. For example, the memory system may combine the PVT and the color bitmap with a bitwise AND operation. In such cases, the memory system may use a logic operation (e.g., the AND operation) between the color bitmap representing the color and the PVT. The memory system may obtain the information associated with the PVT, obtain the information associated with the color bitmap, and combine the information to be used in the garbage collection procedure. In some cases, the memory system may use the logic AND operation for a first color of the color bitmap, and then use the logic AND operation for a second color of the color bitmap. In some cases, the memory system may use the logic AND operation for a third color or a fourth color.

At 425, a target block may be selected. For example, the memory system may select the target block (e.g., destination block). In some cases, the memory system may select the target block associated with the first color and then select the target block associated with the second color. The memory system may select the target block associated with hot data (e.g., the first color) and may select the target block associated with cold data (e.g., the second color). If the selected target block is unavailable to receive the selected type of data, the memory system may initiate a new target block using a free block.

At 430, data may be collected. For example, the memory system may collect data using the logic AND operation. The memory system may process the color according to the PVT. In such cases, the memory system may determine whether the data is valid or invalid data. In response to determining whether the data is valid or invalid data, the memory system may refrain from moving invalid data. In some cases, the memory system may process the first color according to the PVT and then process the second color according to the PVT. In such cases, the memory system may process the hot data prior to processing the cold data. In some examples, the colors may be processed one at a time (e.g., one after the other).

At 435, data may be written in the target block. For example, the memory system may write data in the target block (e.g., destination block) in direct response to processing the colors. The memory system may move, for the garbage collection procedure, a first set of pages of the block of data associated with a first value (e.g., first color) of the characteristic to a first portion of the memory system according to the validity information (e.g., PVT) for the first set of pages. The memory system may move, for the garbage collection procedure, a second set of pages of the block of data associated with a second value (e.g., second color) of the characteristic to a second portion of the memory system according to the validity information (e.g., PVT) for the second set of pages. In such cases, the memory system may move valid data and refrain from moving invalid data. In some examples, the memory system may move, in a first part of the garbage collection procedure, a subset of data associated with a first color and move, in a second part of the garbage collection procedure, a different subset of data associated with a second color.

In some examples, the memory system may move, for the garbage collection procedure, a first portion of a page of the block of data associated with the first value (e.g., first color) of the characteristic to the first portion of the memory system according to the validity information for the page and the information associated with the characteristic for the page. The memory system may move, for the garbage collection procedure, a second portion of the page of the block of data associated with the second value (e.g., second color) of the characteristic to the second portion of the memory system according to the validity information for the page and the information associated with the characteristic for the page.

At 440, a determination may be made of whether the move operations for the color are complete. For example, the memory system may determine whether all valid data for a given color has been moved to the target block. In response to determining that the move operations for the color for the block are incomplete, the memory system may collect data (e.g., for the color) from the block at 430. In some examples, the memory system may determine that the color is complete (e.g., that all the valid data of the color from the block has been moved to the target block). The memory system may determine that the color is complete in response to moving all the valid data of the color in the block.

At 445, a determination may be made whether all the colors are processed. For example, the memory system may determine whether an amount of processed colors satisfies a threshold. In some examples, the memory system may determine that the amount of processed colors fails to satisfy the threshold. In response to determining that one or more colors remain to be processed, the memory system may load the color bitmap at 415. In other examples, the memory system may determine that the amount of processed colors satisfies the threshold (e.g., that all the colors are processed). In response to determining the all the colors are processed, the memory system may move, for the garbage collection procedure, a third set of pages of the block of data associated with a third value of the characteristic to a third portion of the memory system according to the validity information (e.g., PVT) for the third set of pages At 450, the garbage collection procedure may be terminated. For example, the memory system may end (e.g., terminate) the garbage collection procedure in response to determining that all the colors may be processed.

Figure 5:
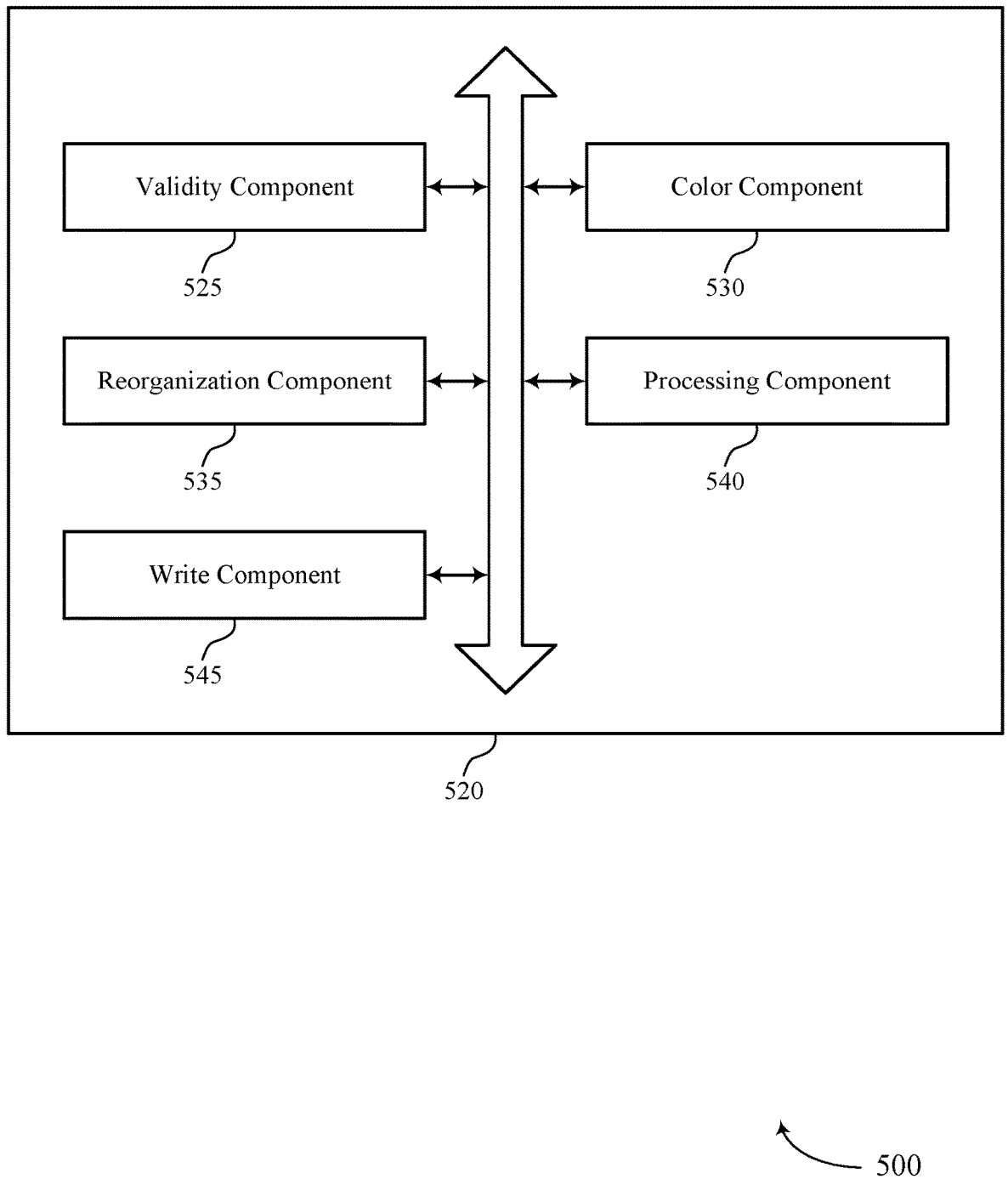
FIG. 5 shows a block diagram of a managed memory system controller that supports page validity table colors for garbage collection in accordance with examples as disclosed herein.

FIG. 5 shows a block diagram 500 of a managed memory system controller 520 that supports page validity table colors for garbage collection in accordance with examples as disclosed herein. The managed memory system controller 520 may be an example of aspects of a managed memory system controller as described with reference to FIGS. 1 through 4. The managed memory system controller 520, or various components thereof, may be an example of means for performing various aspects of page validity table colors for garbage collection as described herein. For example, the managed memory system controller 520 may include a validity component 525, a color component 530, a reorganization component 535, a processing component 540, a write component 545, or any combination thereof. Each of these components may communicate, directly or indirectly, with one another (e.g., via one or more buses).

The validity component 525 may be configured as or otherwise support a means for obtaining validity information for each page of the block of data based at least in part on initiating a reorganization procedure on a block of data of the memory system. The color component 530 may be configured as or otherwise support a means for obtaining information associated with a characteristic for each page of the block of data based at least in part on initiating the reorganization procedure. The reorganization component 535 may be configured as or otherwise support a means for moving, for the reorganization procedure, a first set of pages of the block of data associated with a first value of the characteristic to a first portion of the memory system according to the validity information for the first set of pages. The processing component 540 may be configured as or otherwise support a means for moving, for the reorganization procedure, a second set of pages of the block of data associated with a second value of the characteristic to a second portion of the memory system according to the validity information for the second set of pages.

In some examples, the write component 545 may be configured as or otherwise support a means for receiving, from a host system, a plurality of commands to perform write operations, where the plurality of commands include a stream identifiers for pages of data associated with the plurality of commands, and where obtaining the information associated with the characteristic is based at least in part on receiving the plurality of commands.

In some examples, the write component 545 may be configured as or otherwise support a means for storing the stream identifiers within the block of data. In some examples, the color component 530 may be configured as or otherwise support a means for determining the characteristic for each page of the block of data based at least in part on the stream identifiers.

In some examples, the color component 530 may be configured as or otherwise support a means for determining a type of data associated with each page of the block of data based at least in part on obtaining the information associated with the characteristic, where the characteristic includes the type of data.

In some examples, to support obtaining the information associated with the characteristic, the color component 530 may be configured as or otherwise support a means for obtaining the information associated with the characteristic from one or more memory cells associated with the block of data.

In some examples, to support obtaining the validity information for each page of the block of data, the validity component 525 may be configured as or otherwise support a means for obtaining a page validity table from a portion of the memory system outside of the block of data.

In some examples, the reorganization component 535 may be configured as or otherwise support a means for moving, for the reorganization procedure, a third set of pages of the block of data associated with a third value of the characteristic to a third portion of the memory system according to the validity information for the third set of pages.

In some examples, the information associated with the characteristic includes a bitmap having each bit representing the characteristic for each page of the block of data.

In some examples, the reorganization component 535 may be configured as or otherwise support a means for moving, for the reorganization procedure, a first portion of a page of the block of data associated with the first value of the characteristic to the first portion of the memory system and a second portion of the page of the block of data associated with the second value of the characteristic to the second portion of the memory system according to the validity information for the page and the information associated with the characteristic for the page.

Figure 6:
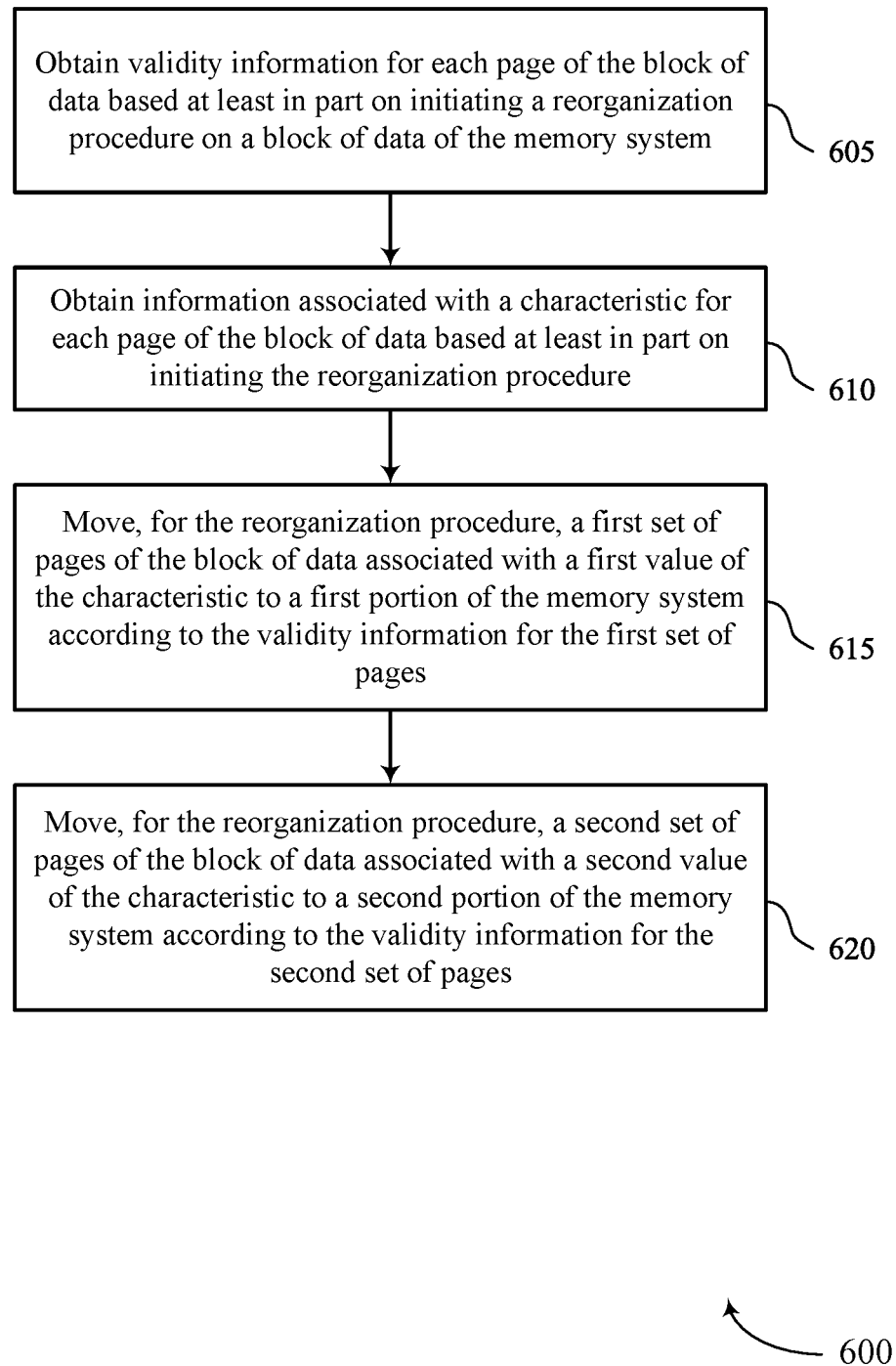
FIG. 6 shows a flowchart illustrating a method or methods that support page validity table colors for garbage collection in accordance with examples as disclosed herein.

FIG. 6 shows a flowchart illustrating a method 600 that supports page validity table colors for garbage collection in accordance with examples as disclosed herein. The operations of method 600 may be implemented by a managed memory system controller or its components as described herein. For example, the operations of method 600 may be performed by a managed memory system controller as described with reference to FIGS. 1 through 5. In some examples, a managed memory system controller may execute a set of instructions to control the functional elements of the device to perform the described functions. Additionally or alternatively, the managed memory system controller may perform aspects of the described functions using special-purpose hardware.

At 605, validity information may be obtained. For example, the method may include obtaining validity information for each page of the block of data based at least in part on initiating a reorganization procedure on a block of data of the memory system. The operations of 605 may be performed in accordance with examples as disclosed herein. In some examples, aspects of the operations of 605 may be performed by a validity component 525 as described with reference to FIG. 5.

At 610, information associated with a characteristic may be obtained. For example, the method may include obtaining information associated with a characteristic for each page of the block of data based at least in part on initiating the reorganization procedure.

The operations of 610 may be performed in accordance with examples as disclosed herein. In some examples, aspects of the operations of 610 may be performed by a color component 530 as described with reference to FIG. 5.

At 615, a first set of pages may be moved. For example, the method may include moving, for the reorganization procedure, a first set of pages of the block of data associated with a first value of the characteristic to a first portion of the memory system according to the validity information for the first set of pages. The operations of 615 may be performed in accordance with examples as disclosed herein. In some examples, aspects of the operations of 615 may be performed by a reorganization component 535 as described with reference to FIG. 5.

At 620, a second set of pages may be moved. For example, the method may include moving, for the reorganization procedure, a second set of pages of the block of data associated with a second value of the characteristic to a second portion of the memory system according to the validity information for the second set of pages. The operations of 620 may be performed in accordance with examples as disclosed herein. In some examples, aspects of the operations of 620 may be performed by a processing component 540 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for obtaining validity information for each page of the block of data based at least in part on initiating a reorganization procedure on a block of data of the memory system, obtaining information associated with a characteristic for each page of the block of data based at least in part on initiating the reorganization procedure, moving, for the reorganization procedure, a first set of pages of the block of data associated with a first value of the characteristic to a first portion of the memory system according to the validity information for the first set of pages, and moving, for the reorganization procedure, a second set of pages of the block of data associated with a second value of the characteristic to a second portion of the memory system according to the validity information for the second set of pages.

Some examples of the method 600 and the apparatus described herein may further include operations, features, circuitry, logic, means, or instructions for receiving, from a host system, a plurality of commands to perform write operations, where the plurality of commands include a stream identifiers for pages of data associated with the plurality of commands, and where obtaining the information associated with the characteristic may be based at least in part on receiving the plurality of commands.

Some examples of the method 600 and the apparatus described herein may further include operations, features, circuitry, logic, means, or instructions for storing the stream identifiers within the block of data and determining the characteristic for each page of the block of data based at least in part on the stream identifiers.

Some examples of the method 600 and the apparatus described herein may further include operations, features, circuitry, logic, means, or instructions for determining a type of data associated with each page of the block of data based at least in part on obtaining the information associated with the characteristic, where the characteristic includes the type of data.

In some examples of the method 600 and the apparatus described herein, obtaining the information associated with the characteristic may include operations, features, circuitry, logic, means, or instructions for obtaining the information associated with the characteristic from one or more memory cells associated with the block of data.

In some examples of the method 600 and the apparatus described herein, obtaining the validity information for each page of the block of data may include operations, features, circuitry, logic, means, or instructions for obtaining a page validity table from a portion of the memory system outside of the block of data.

Some examples of the method 600 and the apparatus described herein may further include operations, features, circuitry, logic, means, or instructions for moving, for the reorganization procedure, a third set of pages of the block of data associated with a third value of the characteristic to a third portion of the memory system according to the validity information for the third set of pages.

In some examples of the method 600 and the apparatus described herein, the information associated with the characteristic includes a bitmap having each bit representing the characteristic for each page of the block of data.

Some examples of the method 600 and the apparatus described herein may further include operations, features, circuitry, logic, means, or instructions for moving, for the reorganization procedure, a first portion of a page of the block of data associated with the first value of the characteristic to the first portion of the memory system and a second portion of the page of the block of data associated with the second value of the characteristic to the second portion of the memory system according to the validity information for the page and the information associated with the characteristic for the page.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and a second condition or action may occur directly as a result of the previous condition or action occurring independent of whether other conditions or actions occur. In some examples, a first condition or action may be performed and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory system; and
   a control circuit coupled with the memory system and configured to cause the apparatus to:
     obtain validity information for each page of a block of data based at least in part on initiating a reorganization procedure on the block of data of the memory system;
     obtain, from a bitmap stored in the block, information associated with a characteristic for each page of the block of data based at least in part on initiating the reorganization procedure, each entry of the bitmap representing the characteristic for one page of the block;
     move, for the reorganization procedure, a first set of pages of the block of data associated with a first value of the characteristic to a first portion of the memory system according to the validity information for the first set of pages, the first portion of the memory system comprising a first type of memory cells configured to store one bit of information per memory cell; and
     move, for the reorganization procedure, a second set of pages of the block of data associated with a second value of the characteristic to a second portion of the memory system according to the validity information for the second set of pages, the second portion of the memory system comprising a second type of memory cells configured to store two or more bits of information per memory cell.

2. The apparatus of claim 1, wherein the control circuit is further configured to cause the apparatus to:
   receive, from a host system, a plurality of commands to perform write operations, wherein the plurality of commands comprise a stream identifiers for pages of data associated with the plurality of commands, and wherein obtaining the information associated with the characteristic is based at least in part on receiving the plurality of commands.

3. The apparatus of claim 2, wherein the control circuit is further configured to cause the apparatus to:
   store the stream identifiers within the block of data; and
   determine the characteristic for each page of the block of data based at least in part on the stream identifiers.

4. The apparatus of claim 1, wherein the control circuit is further configured to cause the apparatus to:
   determine a type of data associated with each page of the block of data based at least in part on obtaining the information associated with the characteristic, wherein the characteristic comprises the type of data.

5. The apparatus of claim 1, wherein, to obtain the information associated with the characteristic, the control circuit is configured to cause the apparatus to:
   obtain the information associated with the characteristic from one or more memory cells associated with the block of data.

6. The apparatus of claim 1, wherein, to obtain the validity information for each page of the block of data, the control circuit is configured to cause the apparatus to:
   obtain a page validity table from a portion of the memory system outside of the block of data.

7. The apparatus of claim 1, wherein the control circuit is further configured to cause the apparatus to:
   move, for the reorganization procedure, a third set of pages of the block of data associated with a third value of the characteristic to a third portion of the memory system according to the validity information for the third set of pages.

8. The apparatus of claim 1, wherein the control circuit is further configured to cause the apparatus to:
move, for the reorganization procedure, a first portion of a page of the block of data associated with the first value of the characteristic to the first portion of the memory system and a second portion of the page of the block of data associated with the second value of the characteristic to the second portion of the memory system according to the validity information for the page and the information associated with the characteristic for the page.

9. A non-transitory computer-readable medium storing code comprising instructions, which when executed by a processor of an electronic device, cause the electronic device to:
obtain validity information for each page of a block of data based at least in part on initiating a reorganization procedure on the block of data of a memory system;
obtain, from a bitmap stored in the block, information associated with a characteristic for each page of the block of data based at least in part on initiating the reorganization procedure, each entry of the bitmap representing the characteristic for one page of the block;
move, for the reorganization procedure, a first set of pages of the block of data associated with a first value of the characteristic to a first portion of the memory system according to the validity information for the first set of pages, the first portion of the memory system comprising a first type of memory cells configured to store one bit of information per memory cell; and
move, for the reorganization procedure, a second set of pages of the block of data associated with a second value of the characteristic to a second portion of the memory system according to the validity information for the second set of pages, the second portion of the memory system comprising a second type of memory cells configured to store two or more bits of information per memory cell.

10. The non-transitory computer-readable medium of claim 9, wherein the instructions, when executed by the processor of the electronic device, further cause the electronic device to:
receive, from a host system, a plurality of commands to perform write operations, wherein the plurality of commands comprise a stream identifiers for pages of data associated with the plurality of commands, and wherein obtaining the information associated with the characteristic is based at least in part on receiving the plurality of commands.

11. The non-transitory computer-readable medium of claim 10, wherein the instructions, when executed by the processor of the electronic device, further cause the electronic device to:
store the stream identifiers within the block of data; and
determine the characteristic for each page of the block of data based at least in part on the stream identifiers.

12. The non-transitory computer-readable medium of claim 9, wherein the instructions, when executed by the processor of the electronic device, further cause the electronic device to:
determine a type of data associated with each page of the block of data based at least in part on obtaining the information associated with the characteristic, wherein the characteristic comprises the type of data.

13. The non-transitory computer-readable medium of claim 9, wherein the instructions to obtain the information associated with the characteristic, when executed by the processor of the electronic device, cause the electronic device to:
obtain the information associated with the characteristic from one or more memory cells associated with the block of data.

14. The non-transitory computer-readable medium of claim 9, wherein the instructions to obtain the validity information for each page of the block of data, when executed by the processor of the electronic device, cause the electronic device to:
obtain a page validity table from a portion of the memory system outside of the block of data.

15. The non-transitory computer-readable medium of claim 9, wherein the instructions, when executed by the processor of the electronic device, further cause the electronic device to:
move, for the reorganization procedure, a third set of pages of the block of data associated with a third value of the characteristic to a third portion of the memory system according to the validity information for the third set of pages.

16. A method performed by a memory system, comprising:
obtaining validity information for each page of a block of data based at least in part on initiating a reorganization procedure on the block of data of the memory system;
obtaining, from a bitmap stored in the block, information associated with a characteristic for each page of the block of data based at least in part on initiating the reorganization procedure, each entry of the bitmap representing the characteristic for one page of the block;
moving, for the reorganization procedure, a first set of pages of the block of data associated with a first value of the characteristic to a first portion of the memory system according to the validity information for the first set of pages, the first portion of the memory system comprising a first type of memory cells configured to store one bit of information per memory cell; and
moving, for the reorganization procedure, a second set of pages of the block of data associated with a second value of the characteristic to a second portion of the memory system according to the validity information for the second set of pages, the second portion of the memory system comprising a second type of memory cells configured to store two or more bits of information per memory cell.

17. The method of claim 16, further comprising:
receiving, from a host system, a plurality of commands to perform write operations, wherein the plurality of commands comprise a stream identifiers for pages of data associated with the plurality of commands, and wherein obtaining the information associated with the characteristic is based at least in part on receiving the plurality of commands.

18. The method of claim 17, further comprising:
storing the stream identifiers within the block of data; and
determining the characteristic for each page of the block of data based at least in part on the stream identifiers.

19. The method of claim 16, further comprising:
determining a type of data associated with each page of the block of data based at least in part on obtaining the information associated with the characteristic, wherein the characteristic comprises the type of data.

20. The method of claim 16, wherein obtaining the information associated with the characteristic further comprises:
   obtaining the information associated with the characteristic from one or more memory cells associated with the block of data.

21. The method of claim 16, wherein obtaining the validity information for each page of the block of data further comprises:
   obtaining a page validity table from a portion of the memory system outside of the block of data.

22. The method of claim 16, further comprising:
   moving, for the reorganization procedure, a third set of pages of the block of data associated with a third value of the characteristic to a third portion of the memory system according to the validity information for the third set of pages.

* * * * *